United States Patent
Bollström et al.

(10) Patent No.: US 12,050,174 B2
(45) Date of Patent: Jul. 30, 2024

(54) METHOD FOR DETECTING PHOSPHATE AND/OR SULPHATE SALTS ON THE SURFACE OF A SUBSTRATE OR WITHIN A SUBSTRATE, USE OF A LWIR DETECTING DEVICE AND A LWIR IMAGING SYSTEM

(71) Applicant: OMYA INTERNATIONAL AG, Oftringen (CH)

(72) Inventors: Roger Bollström, Zofingen (CH); Kai Max Hettmann, Grenzach-Wyhlen (DE)

(73) Assignee: OMYA INTERNATIONAL AG, Oftringen (CH)

( * ) Notice: Subject to any disclaimer, the term of this patent is extended or adjusted under 35 U.S.C. 154(b) by 104 days.

(21) Appl. No.: 17/259,343

(22) PCT Filed: Jul. 19, 2019

(86) PCT No.: PCT/EP2019/069475
§ 371 (c)(1),
(2) Date: Jan. 11, 2021

(87) PCT Pub. No.: WO2020/016401
PCT Pub. Date: Jan. 23, 2020

(65) Prior Publication Data
US 2021/0293699 A1    Sep. 23, 2021

(30) Foreign Application Priority Data

Jul. 20, 2018   (EP) ................................ 18184769

(51) Int. Cl.
*G01N 21/3563*   (2014.01)
*B41M 3/14*      (2006.01)
*B42D 25/382*    (2014.01)

(52) U.S. Cl.
CPC ......... *G01N 21/3563* (2013.01); *B41M 3/14* (2013.01); *B42D 25/382* (2014.10); *G01N 2201/0633* (2013.01)

(58) Field of Classification Search
CPC ....... G01N 21/3563; G01N 2201/0633; G01N 2021/3595; G01N 21/35; B41M 3/14; B42D 25/382; G07D 7/12; G07D 7/1205
See application file for complete search history.

(56) References Cited

U.S. PATENT DOCUMENTS 5,289,266 A * 2/1994 Shih ................... G01N 21/8422
                                                     356/504
5,828,068 A    10/1998 Weirauch
(Continued)

FOREIGN PATENT DOCUMENTS

CN   202230219 U   5/2012
CN   103713347 A   4/2014
(Continued)

OTHER PUBLICATIONS

International Search Report from PCT/EP2019/069475, mailed Nov. 4, 2019, 4 pages.
(Continued)

*Primary Examiner* — Marcus H Taningco
(74) *Attorney, Agent, or Firm* — ALGM LLP; Harry J. Guttman (57) ABSTRACT

The present invention refers to method for detecting phosphate and/or sulphate salts on the surface of a substrate or within a substrate, use of a LWIR detecting device for detecting the intensity of electromagnetic radiation scattered and/or emitted reflection by phosphate and/or sulphate salts being present on and/or in a substrate, use of a substrate comprising phosphate and/or sulphate salts for providing information via electromagnetic radiation scattering and/or (Continued)

Infrared spectra between 8 and 14 μm emission as well as a LWIR imaging system for detecting phosphate and/or sulphate salts on and/or within a substrate.

23 Claims, 3 Drawing Sheets

(56) References Cited

U.S. PATENT DOCUMENTS

| | | | |
|---|---|---|---|
| 8,547,555 B1 * | 10/2013 | Bradley | G01J 3/021 |
| | | | 356/445 |
| 9,204,109 B1 | 12/2015 | deLaneuville et al. | |
| 2008/0042063 A1 | 2/2008 | Chen | |
| 2012/0031576 A1 | 2/2012 | Gane et al. | |
| 2014/0248340 A1 | 9/2014 | Schwarzentruber et al. | |
| 2015/0226722 A1 | 8/2015 | Sengupta et al. | |
| 2017/0078591 A1 * | 3/2017 | Petrov | H04N 5/04 |
| 2017/0089761 A1 | 3/2017 | McQuilkin et al. | |
| 2018/0157012 A1 | 6/2018 | Jin | |
| 2018/0340298 A1 * | 11/2018 | Bollström | B42D 25/378 |

FOREIGN PATENT DOCUMENTS

| | | |
|---|---|---|
| CN | 106556531 A * | 4/2017 |
| CN | 107729907 A | 2/2018 |
| EP | 1712523 A1 | 10/2006 |
| EP | 1712597 A1 | 10/2006 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| EP | 2764320 | 4/2013 |
| EP | 3173522 A1 | 5/2017 |
| EP | 3067214 B1 | 12/2017 |
| EP | 3293011 A1 | 3/2018 |
| JP | 2006091001 A | 4/2006 |
| TW | 200511592 A | 3/2005 |
| WO | 00/39222 A1 | 7/2000 |
| WO | 2009/074492 A1 | 6/2009 |
| WO | 2013/142473 A1 | 9/2013 |

OTHER PUBLICATIONS

Written Opinion from PCT/EP2019/069475, mailed Nov. 4, 2019, 11 pages.
CN 103713347 A (Apr. 9, 2014)—English-language abstract from Espacenet, 1 page.
CN 107729907 A (Feb. 23, 2018)—English-language abstract from Espacenet, 1 page.
CN 202230219 U (May 23, 2012)—English-language abstract from Espacenet, 1 page.
TW 200511592 A (Mar. 16, 2005)—English-language abstract from Espacenet, 1 page.
JP 2006091001 A (Apr. 6, 2006)—English-language abstract from Espacenet, 1 page.

* cited by examiner

Figure 1. Transmission based LWIR imaging system

Figure 2. Reflectance based LWIR imaging system

Figure 3. Reflectance based LWIR imaging system

Figure 4. Infrared spectra between 8 and 14 μm

Figure 5. LWIR imaging system with connection to a mobile phone

Figure 6. LWIR imaging system integrated into a mobile phone

METHOD FOR DETECTING PHOSPHATE AND/OR SULPHATE SALTS ON THE SURFACE OF A SUBSTRATE OR WITHIN A SUBSTRATE, USE OF A LWIR DETECTING DEVICE AND A LWIR IMAGING SYSTEM

CROSS-REFERENCE TO RELATED APPLICATIONS

This application is a National Stage Entry of International Application No. PCT/EP2019/069475 filed Jul. 19, 2019, entitled "METHOD FOR DETECTING PHOSPHATE AND/OR SULPHATE SALTS ON THE SURFACE OF A SUBSTRATE OR WITHIN A SUBSTRATE, USE OF A LWIR DETECTING DEVICE AND A LWIR IMAGING SYSTEM", and which claims priority to EP Application No. 18184769.0 filed Jul. 20, 2018 entitled "METHOD FOR DETECTING PHOSPHATE AND/OR SULPHATE SALTS ON THE SURFACE OF A SUBSTRATE OR WITHIN A SUBSTRATE, USE OF A LWIR DETECTING DEVICE AND A LWIR IMAGING SYSTEM."

The present invention refers to method for detecting phosphate and/or sulphate salts on the surface of a substrate or within a substrate, use of a LWIR detecting device for detecting the intensity of electromagnetic radiation scattered and/or emitted reflection by phosphate and/or sulphate salts being present on and/or in a substrate, use of a substrate comprising phosphate and/or sulphate salts for providing information via electromagnetic radiation scattering and/or emission as well as a LWIR imaging system for detecting phosphate and/or sulphate salts on and/or within a substrate.

Printing of substrates, for example papers, with printing colors is a wide known technique. Newspapers, leaflets, labels, pictures etc. are nowadays printed with various printing techniques and printing colors. The print on the substrate can be detected by human eyes, but only if there is a further light source like sun light. Furthermore, the print can only be detected if the colour of the print and the substrate are different. However, in some cases it is desirable to detect the printing or coating on a substrate even in the dark. Furthermore, it is desirable to print or coat a substrate with a pattern that is not visible or hardly visible to human eyes, but can be detected easily with other detecting methods, for example, by irradiation with IR light.

IR light has a longer wavelength than visible light. Even if IR light shares many of the properties of visible light, its different wavelength has several unique characteristics. For example, materials that are opaque to visible light may be transparent to IR, and vice-versa. Furthermore, IR light is much less subject to scattering and absorption by smoke or dust than visible light, and IR light cannot be seen by the human eye. Contrary to visible light that is emitted by objects only at very high temperatures, IR energy is also emitted by all objects at temperatures higher than absolute 0° C. Therefore, IR energy is omnipresent all the time, even in the dark and at very low temperatures. Different objects emit varying amounts of IR energy, depending on the temperature of the object and their emissivity. IR detecting devices can sense or detect differing intensities of IR energy coming from the various areas of a scene. Usually, an IR detecting device converts the detected electromagnetic radiation to corresponding intensities of visible light by electronics, for example a computer device for display purposes. This permits true see-in-the-dark capability as well as the ability to observe thermal properties under all light conditions. Furthermore, this permits the ability to detect structural differences on objects or within objects, for example, due to different compounds, that are not detectable by the human eye.

IR detecting devices and methods are known to the skilled person, for example from US 2018/157012 A1 that refers to an infrared optical system using the wavelength range of 3 to 5 μm, in the order from an object side, a first lens having a negative power and formed with a convex meniscus toward an object, a second lens that is convex on both sides, and a cold aperture.

TW 2005/11592 A refers to an IR camera system which includes an array of thermally-tunable optical filter pixels, an NIR source and an NLR detector array.

CN 107729907 A refers to an infrared thermal imaging system-based fault recognition method, the method comprising the steps of shooting electric equipment by adoption of an infrared thermal imaging system so as to obtain an infrared image of the electric equipment and fusing the infrared image of the electric equipment after the expansion processing with a visible image of original electric equipment so as to differentiate heating targets in the electric equipment from surrounding background.

U.S. Pat. No. 9,204,109 B1 refers to IR detection of small cracks during fatigue testing and especially, a process for producing a small crack in a turbine rotor blade for use in training inspectors to be qualified for inspecting blades with small crack, where each blade is vibrated in order to initiate a small crack under observation using an IR camera that can detect for a small crack, and when a small crack at a desired size is produced on the blade, the vibration is stopped and the blade removed and then used in a training process to train and qualify an inspector for an inspection process.

US 2008/0042063 A1 refers to an IR imaging system including a lens module and an imaging module coupled to the lens module, wherein the lens module includes a barrel defining a through hole, at least one lens received in the through hole and an IR bandpass filter received in the barrel and configured for filtering out visible light.

However, not only the print or coating on the substrate but also the substrate itself is detectable by an IR detecting device. Often the electromagnetic radiation scattered and/or emitted reflection by the substrate itself and the electromagnetic radiation scattered and/or emitted reflection by the print or coating interfere or are superposed and, therefore, detection of the print or coating is impossible.

Therefore, there is a need for providing an improved method for detecting prints or coatings on a substrate or within a substrate, which method avoids or reduces the problems described above in relation to the known methods. More precisely, there is a need for providing a method for detecting prints or coatings on a substrate or within a substrate that are not or hardly detectable by the human eye, but can be detected easily by an IR detecting device. Furthermore, there is a need for providing a method for detecting prints or coatings on a substrate or within a substrate that do not interfere with the substrate or parts of the substrate. Furthermore, the substrate as well as the print or coating on the substrate should not be destroyed by the detection method. Additionally, it is desirable that the detection method can be easily and cheap performed and that the equipment for the detection is light and transportable, e.g. a handheld device.

One or more of the foregoing objects have been solved by the present invention.

According to one aspect of the present invention, a method for detecting an amorphous and/or crystalline structure of phosphate and/or sulphate salts on the surface of a substrate or within a substrate is provided, the method comprising the steps of     i) providing a substrate comprising an amorphous and/or crystalline structure of phosphate and/or sulphate salts on the surface of the substrate and/or within the substrate,     ii) providing a LWIR detecting device,     iii) irradiating the substrate of i) with infrared light at least over the whole wavelength range of 8 to 14 µm, and     iv) detecting the intensity of electromagnetic radiation scattered and/or emitted reflection by the substrate and the amorphous and/or crystalline structure of phosphate and/or sulphate salts due to the irradiation in step iii) with the LWIR detecting device provided in step ii).

The inventors surprisingly found that if a substrate is provided comprising an amorphous and/or crystalline structure of phosphate and/or sulphate salts on the surface of the substrate and/or within the substrate, and if this substrate is irradiated with infrared light at least over the whole wavelength range of 8 to 14 µm, then the intensity of electromagnetic radiation scattered and/or emitted reflection by the substrate and the amorphous and/or crystalline structure of phosphate and/or sulphate salts due to the irradiation in step iii) can be detected with a LWIR detecting device. This method of irradiating, scattering and/or emitting and detecting electromagnetic radiation allows for making the phosphate and/or sulphate salts or patterns on the surface of a substrate or within a substrate clearly visible.

Substrates such as, for example, papers, sheets, foils, cardboards, polymer films, woven or non-woven polymeric textiles comprising an amorphous and/or crystalline structure of phosphate and/or sulphate salts on the surface of the substrate or within the substrate such that the amorphous and/or crystalline structure of phosphate and/or sulphate salts is not or only hardly detectably by the human eye are known to the skilled person. The manufacture or application of such substrates with amorphous and/or crystalline structures of phosphate and/or sulphate salts on the surface of the substrate or within the substrate is known to the skilled person and, for example, described in EP 3 067 214 B1. The methods and materials described therein are incorporated herein by reference. If the substrate comprising the amorphous and/or crystalline structure of phosphate and/or sulphate salts is irradiated with infrared light at least over the whole wavelength range of 8 to 14 µm, the intensity of electromagnetic radiation emitted reflection by the substrate and the amorphous and/or crystalline structure of phosphate and/or sulphate salts can be detected with a LWIR (long-wave infrared) detecting device. The inventors surprisingly found that by the above method the prints or coatings comprising the amorphous and/or crystalline structure of phosphate and/or sulphate salts can be easily detected without destroying or damaging the substrate and the print or coating. Furthermore, the inventors surprisingly found that by the above method, the electromagnetic radiation scattered and/or emitted reflection by the amorphous and/or crystalline structure of phosphate and/or sulphate salts and by the substrate do not or not significantly interfere, especially if the substrate comprises cellulose. Furthermore, the above method can be performed easily, is cheap and the equipment for the detection is light and transportable, e.g. a handheld device.

According to another aspect of the present invention, a LWIR detecting device for detecting the intensity of electromagnetic radiation scattered and/or emitted reflection by an amorphous and/or crystalline structure of phosphate and/or sulphate salts being coated on the surface of a substrate and/or being present in the substrate is used.

According to another aspect of the present invention, a substrate being at least partially coated with or comprising within an amorphous and/or crystalline structure of phosphate and/or sulphate salts is used for providing information via electromagnetic radiation scatter and/or emission being detectable by LWIR detecting devices.

According to another aspect of the present invention a LWIR imaging system for detecting an amorphous and/or crystalline structure of phosphate and/or sulphate salts on the surface of a substrate or within a substrate is provided, the system comprising a) an infrared light emitting source that emits in the whole range of 8 to 14 µm and b) a LWIR detecting device.

Advantageous embodiments of the present invention are defined in the corresponding sub-claims.

It is to be understood that the embodiments described in the following for one aspect are also applicable to the other aspects of the present invention.

According to one embodiment of the present invention, the substrate is a paper, sheet, foil, cardboard, polymer film, woven, non-woven polymeric textile, and/or wherein the substrate comprises cellulose.

According to another embodiment of the present invention, the phosphate and/or sulphate salts on the surface of the substrate or within the substrate are calcium phosphate and/or calcium sulphate.

According to another embodiment of the present invention, the substrate is laminated and preferably is laminated with a polymer layer, wherein the laminate layer is at least partially transparent over the whole wavelength range of 8 to 14 µm.

According to another embodiment of the present invention, the LWIR detecting device is a bolometer or a sensor comprising mercury cadmium telluride and preferably the LWIR detecting device is a bolometer.

According to another embodiment of the inventive method, in step iii) the irradiated infrared light is focused and/or scattered by at least one focusing/scattering device. Preferably, the at least one focusing device is a collimator and/or the at least one focusing/scattering device is a lens and/or the at least one focusing and/or focusing/scattering device is located between the infrared light emitting source if present and the substrate.

According to another embodiment of the inventive method, in step iv) the scattered and/or emitted electromagnetic radiation is collected and optionally focused by at least one collecting device. Preferably, the at least one collecting device is an objective and preferably a lens and/or the at least one collecting device is located between the substrate and the LWIR detecting device.

According to another embodiment of the inventive method, in step iv) the scattered and/or emitted electromagnetic radiation is filtered by at least one filtering device. Preferably, the at least one filtering device is an optical filter, preferably a bandpass filter or a combination of a long pass and short pass filter or a tunable filter, preferably a tunable MEMS Fabry-Perot filter, more preferably a bandpass filter in the range of 8.8 to 9.3 µm or 10.0 to 10.6 or 11.3 to 11.8 µm or a combination of a long pass filter of 8 µm and a short pass filter of 8.8 µm or a combination of a long pass filter of 10.3 µm and a short pass filter of 10.8 µm, or a tunable filter in the range of 8 to 14 µm and preferably has a spectral resolution of 100 nm and below and/or the at least one filtering device is located between the substrate and the LWIR detecting device and preferably between the objective if present and the LWIR detecting device.

According to another embodiment of the present invention, the method comprises a further step of reading out the amount of the detected intensity of electromagnetic radiation in step iv) by a computer device, wherein the computer device preferably is a mobile phone.

According to another embodiment of the present invention, the LWIR imaging system is located in a housing, and preferably the housing is connectable to a computer device, wherein connectable provides for means of wired or wireless transmission.

It should be understood that for the purpose of the present invention, the following terms have the following meaning.

An amorphous or non-crystalline structure in the meaning of the present invention refers to a structure that lacks the long-range order that is characteristic of a crystals. The crystal or crystalline structure in the meaning of the present invention refers to the ordered arrangement of atoms, ions or molecules in a crystalline material. The terms and measurement methods for determining amorphous and crystal structures are known to the skilled person.

A phosphate salt in the meaning of the present invention is a compound that comprises phosphate anions and counter cations.

A sulphate salt in the meaning of the present invention is a compound that comprises sulphate anions and counter cations.

The term "substrate" in the meaning of the present invention refers to an article having an outer surface, preferably a paper, sheet, foil, cardboard, polymer film, woven or non-woven polymeric textile that serves as support for the amorphous and/or crystalline structure of phosphate and/or sulphate salts.

A LWIR detecting device is a detecting device that can detect LWIR. LWIR is the abbreviation for "longwave infrared" or "long wavelength infrared". LWIR refers to a range of 8 to 14 μm, having a frequency of 20 to 37 THz, a photon energy of 155 meV to 89 meV. These photon energy can be calculated from the wavelength by the equation $E=hc/\lambda$, wherein E refers to the photon energy in electron volts, h is the Planck constant, c is the speed of light and $\lambda$ is the wave length in μm.

Electromagnetic radiation (EM radiation or EMR) in the meaning of the present invention refers to the waves of the electromagnetic field, propagating (radiating) through space, carrying electromagnetic radiant energy. Radiant energy is the energy of electromagnetic waves. It is a form of energy that can travel through space.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention, a method for detecting an amorphous and/or crystalline structure of phosphate and/or sulphate salts on the surface of a substrate or within a substrate is provided, the method comprising the steps of i) providing a substrate comprising an amorphous and/or crystalline structure of phosphate and/or sulphate salts on the surface of the substrate and/or within the substrate, ii) providing a LWIR detecting device, iii) irradiating the substrate of i) with infrared light at least over the whole wavelength range of 8 to 14 μm, and iv) detecting the intensity of electromagnetic radiation scattered and/or emitted reflection by the substrate and the amorphous and/or crystalline structure of phosphate and/or sulphate salts due to the irradiation in step iii) with the LWIR detecting device provided in step ii).

In the following details and preferred embodiments of the inventive method will be set out in more details. It is to be understood that these technical details and embodiments also apply to the inventive use of the LWIR detecting device and the inventive use of the substrate as well as to the inventive LWIR imaging system.

Substrate

According to step i) of the method of the present invention, a substrate is provided comprising an amorphous and/or crystalline structure of phosphate and/or sulphate salts on the surface of the substrate and/or within the substrate.

In other words, the substrate serves as support for the amorphous and/or crystalline structure of phosphate and/or sulphate salts and may be opaque, translucent, or transparent.

According to one embodiment, the substrate is a paper, sheet, foil, cardboard, polymer film, woven, non-woven polymeric textile, preferably a paper or cardboard and most preferably a paper. The substrate can also be a laminate of paper, plastic and/or metal, wherein preferably the plastic and/or metal are in form of thin foils such as for example used in Tetra Pak. However, any other material having a surface suitable for printing, coating or painting on may also be used as substrate. Additionally or alternatively, the substrate comprises cellulose.

According to a preferred embodiment the substrate comprises cellulose and is a paper, sheet, foil, cardboard, polymer film, woven, non-woven polymeric textile, preferably a paper or cardboard and most preferably is a paper. Preferably, the amount of cellulose in the substrate is above 20 wt.-%, based on the total weight of the substrate comprising an amorphous and/or crystalline structure of phosphate and/or sulphate salts on the surface of the substrate and/or within the substrate, more preferably above 40 wt.-%, even more preferably above 60 wt.-% and most preferably above 80 wt.-% based on the total weight of the substrate comprising an amorphous and/or crystalline structure of phosphate and/or sulphate salts on the surface of the substrate and/or within the substrate.

According to one embodiment of the present invention, the substrate is paper, sheet, or cardboard. Cardboard may comprise carton board or boxboard, corrugated cardboard, or non-packaging cardboard such as chromoboard, or drawing cardboard. The paper, sheet or cardboard substrate can have a basis weight from 10 to 1 000 g/m², from 20 to 800 g/m², from 30 to 700 g/m², or from 50 to 600 g/m².

According to one embodiment, the substrate is paper, preferably having a basis weight from 10 to 400 g/m$^2$, 20 to 300 g/m$^2$, 30 to 200 g/m$^2$, 40 to 100 g/m$^2$, 50 to 90 g/m$^2$, 60 to 80 g/m$^2$, or about 70 g/m$^2$.

The term "basis weight" as used in the present invention is determined according to DIN EN ISO 536:1996, and is defined as the weight in g/m$^2$.

According to another embodiment the substrate is a foil. The foil can be a metal foil such as aluminium, copper, tin, or gold foil or a highly-filled polymer foil comprising metals as filler such as aluminium, copper, tin, or gold. The foil can have a thickness from 800 nm to 1 mm, preferably from 100 μm to 0.5 mm or from 200 μm to 0.3 mm.

According to another embodiment, the substrate is a polymer substrate. Suitable polymer materials are, for example, polyethylene, polypropylene, polyvinylchloride, polyesters, polycarbonate resins, or fluorine-containing resins, preferably polypropylene. Examples for suitable polyesters are poly(ethylene terephthalate), poly(ethylene naphthalate) or poly(ester diacetate). An example for a fluorine-containing resins is poly(tetrafluoro ethylene). The polymer substrate may be filled with a mineral filler, an organic pigment, an inorganic pigment, or mixtures thereof. Preferably the polymer substrate is filled with a mineral filler, for example GCC, MCC or PCC.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and water-insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, WO 00/39222 A1, or EP 2 264 108 A1.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

According to another embodiment of the present invention, the substrate may be a woven or non-woven polymeric textile.

Additionally or alternatively, the substrate comprises cellulose. According to the present invention cellulose is an organic compound with the formula $(C_6H_{10}O_5)_n$, a polysaccharide consisting of a linear chain of several hundred to many thousands of β(1→4) linked D-glucose units. Cellulose is an important structural component of the primary cell wall of green plants, many forms of algae and the oomycetes. Cellulose is the most abundant organic polymer on earth and the cellulose content of cotton fiber is 90%, that of wood is 40-50%, and that of dried hemp is approximately 57%. Cellulose is the main component of papers, sheets and cardboard. According to the present invention the cellulose may be the neat cellulose or may be chemically modified, for example in the form of carboxymethyl cellulose (CMC). CMC is a cellulose derivative with carboxymethyl groups (—CH$_2$—COOH) bound to some of the hydroxyl groups of the glucopyranose monomers that make up the cellulose backbone. The cellulose may be present in form of a salt, for example a sodium salt such as sodium carboxymethyl cellulose.

According to a preferred embodiment of the present invention, the substrate is a paper, sheet, or cardboard comprising cellulose and optionally calcium carbonate.

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers, wherein the sublayers can have a flat or non-flat structure, e.g. a corrugated structure. Preferably the sublayers of the substrate are made from paper, cardboard, polymer film and/or plastic.

The substrate may be permeable or impermeable for solvents, water, or mixtures thereof. According to one embodiment, the substrate is impermeable for water, solvents, or mixtures thereof. Examples for solvents aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to the present invention the substrate provided in step i) comprises an amorphous and/or crystalline structure of phosphate and/or sulphate salts on the surface of the substrate and/or within the substrate.

An amorphous or non-crystalline solid or structure according to the present invention is a solid or structure that lacks the long-range order that is characteristic of crystals. An amorphous solid has an internal structure made of interconnected structural blocks, having a high degree of connectivity. Contrary to that the crystal structure comprises ordered arrangement of atoms, ions or molecules in a crystalline material.

The ordered structures occur from the intrinsic nature of the constituent particles to form symmetric patterns that repeat along the principal directions of three-dimensional space. Amorphous and non-crystalline structures and measurement methods for determining amorphous and crystalline structures are known to the skilled person. For example, it can be detected by X-ray crystallography whether a structure is amorphous or crystalline.

A phosphate salt in the meaning of the present invention is a compound that comprises phosphate anions and counter cations. The phosphate anion is defined as $PO_4^{3-}$ and the cation is inorganic. For example, the phosphate salt may be aluminum phosphate, calcium phosphate, calcium orthophosphate, magnesium phosphate, potassium phosphate, or sodium phosphate. According to a preferred embodiment the phosphate salt is calcium phosphate.

A sulphate salt in the meaning of the present invention is a compound that comprises sulphate anions and counter cations. The sulphate anion is defined as $SO_4^{2-}$ and the cation is inorganic. For example, the sulphate salt may be calcium sulphate, copper sulphate, iron sulphate, or magnesium sulphate. According to a preferred embodiment the sulphate salt is calcium sulphate.

According to the present invention the substrate provided in step i) comprises the salts on the surface of the substrate and/or within the substrate.

According to one embodiment of the present invention the salts are only present on the surface of the substrate, especially in the form of a coating. For the purpose of the present invention, the term "coating" or "coating layer" refers to a layer, covering at least partially or in the form of a pattern the substrate, which is formed, created, prepared etc., from a coating formulation which remains predominantly on one side of the substrate. The coating can be in direct contact with the surface of the substrate or, in case the substrate comprises one or more precoating layers and/or barrier layers, can be in direct contact with the top precoating layer or barrier layer, respectively. The coating formulation may comprise the phosphate and/or sulfate salt directly. Alternatively, the coating formulation may comprise phosphoric acid and/or sulphuric acid and the substrate may comprise calcium and/or magnesium carbonate. When bringing these compounds in direct contact, calcium and/or magnesium phosphate and/or sulphate is obtained.

According to another embodiment of the present invention the salts are only present within the substrate. Alternatively, the substrate provided in step i) comprises the salts on the surface of the substrate and within the substrate.

According to one embodiment of the present invention, the substrate provided in step i) comprises only an amorphous structure of phosphate salts on the surface of the substrate and/or within the substrate. According to another embodiment, the substrate provided in step i) comprises only a crystalline structure of phosphate salts on the surface of the substrate and/or within the substrate. According to another embodiment the substrate provided in step i) comprises an amorphous and a crystalline structure of phosphate salts on the surface of the substrate and/or within the substrate. According to a preferred embodiment the phosphate salt is calcium phosphate. Preferably the phosphate salt is present on the surface of the substrate.

According to one embodiment of the present invention, the substrate provided in step i) comprises only an amorphous structure of sulphate salts on the surface of the substrate and/or within the substrate. According to another embodiment the substrate provided in step i) comprises only a crystalline structure of sulphate salts on the surface of the substrate and/or within the substrate. According to another embodiment the substrate provided in step i) comprises an amorphous and a crystalline structure of sulphate salts on the surface of the substrate and/or within the substrate. According to a preferred embodiment the sulphate salt is calcium sulphate. Preferably the sulphate salt is present on the surface of the substrate.

According to a preferred embodiment of the present invention the substrate provided in step i) comprises an amorphous and/or crystalline structure of calcium phosphate on the surface of the substrate. Preferably the calcium phosphate is obtained by coating a substrate that comprises calcium carbonate with phosphoric acid. Furthermore, it is preferred that the substrate is a paper, sheet or cardboard and comprises cellulose.

According to another preferred embodiment of the present invention the substrate provided in step i) comprises an amorphous and/or crystalline structure of calcium sulphate on the surface of the substrate. Preferably the calcium sulphate is obtained by coating a substrate that comprises calcium carbonate with sulphuric acid. Furthermore, it is preferred that the substrate is a paper, sheet or cardboard and comprises cellulose.

According to another embodiment of the present invention the substrate is laminated or coated and preferably is laminated or coated with a polymer layer, wherein the laminate or coating layer is at least partially transparent over the whole wavelength range of 8 to 14 µm. According to the present invention the term "laminate" refers to a sheet of material, which can be applied over a substrate and bonded to the substrate, thereby forming a laminated substrate. Other methods of applying the polymer layer include but are not limited to melt processing techniques, such as for example co-extrusion. Transparent or at least partially transparent means that if the laminate is irradiated with infrared light at least over the whole wavelength range of 8 to 14 µm, the laminate does not scatter and/or emit or only partially scatter and/or emit electromagnetic radiation in said wavelength range. For example the laminate or coating is an infrared transparent polymer matrix, wherein the polymer matrix is a film forming polyolefin, comprising a polymer selected from polyethylene, polypropylene, polybutene-1, polymethylpentene, and cyclo olefin polymers and combinations thereof. Such infrared transparent polymer matrices are known to the skilled person and are described, for example in EP 2 764 320.

LWIR Detecting Device

According to method step ii) a LWIR detecting device is provided.

LWIR is the abbreviation for "longwave infrared" or "long wavelength infrared" and is also known as "thermal infrared". LWIR is part of the infrared (IR) spectrum. Infrared radiation (IR) is electromagnetic radiation with longer wavelengths than those of visible light, and is therefore generally invisible to the human eye. It is also known as infrared light. IR wavelengths extend from the nominal red edge of the visible spectrum at 700 nanometers (frequency 430 THz), to 1 millimeter (300 GHz). The infrared comprises the near infrared (NIR), the short wavelength infrared (SWIR), the mid wavelength infrared (MWIR) and the long wavelength infrared (LWIR). The NIR refers to a range of 0.75 to 1.4 µm, having a frequency of 214 to 400 THz, and a photon energy of 886 to 1653 meV. The SWIR refers to a range of 1.4 to 3 µm, having a frequency of 100 to 214 THz, and a photon energy of 413 to 886 meV. The MWIR refers to a range of 3 to <8 µm, having a frequency of >37 to 100 THz, and a photon energy of >155 to 413 meV. The LWIR refers to a range of 8 to 14 µm, having a frequency of 20 to 37 THz, a photon energy of 155 meV to 89 meV.

Infrared radiation is scattered, emitted or absorbed by molecules when they change their rotational-vibrational movements. It excites vibrational modes in a molecule through a change in the dipole moment and afterwards by the transformation of the adsorbed light to a vibrational force. Infrared spectroscopy examines absorption and transmission of photons in the infrared range and is known to the skilled person.

A LWIR detecting device according to the present invention is a detection device that can detect LWIR. Such detecting devices are known to the skilled person and commercially available.

According to one embodiment of the present invention the LWIR detecting device is a bolometer or a sensor comprising mercury cadmium telluride and preferably the LWIR detecting device is a bolometer.

A bolometer is a device for measuring the power or intensity of electromagnetic radiation via the heating of a material with a temperature-dependent electrical resistance. A bolometer consists of an absorptive element, such as a thin layer of metal, connected to a thermal reservoir (a body of constant temperature) through a thermal link. The result is that any radiation impinging on the absorptive element raises its temperature above that of the reservoir—the greater the absorbed power, the higher the temperature. The intrinsic thermal time constant, which sets the speed of the detector, is equal to the ratio of the heat capacity of the absorptive element to the thermal conductance between the absorptive element and the reservoir. The temperature change can be measured directly with an attached resistive thermometer, or the resistance of the absorptive element itself can be used as a thermometer. Metal bolometers usually work without cooling. They are produced from thin foils or metal films. Alternatively the bolometer may use a semiconductor or a superconductor absorptive element rather than a metal. Bolometers are known to the skilled person and are commercially available, for example from Seek Thermal, (https://www.thermal.com); Thermal Expert (http://www.i3-thermalexpert.com); Flir, (https://www.flir.com); or Ulis, (https://www.Ulis-ir.com).

Alternatively, a sensor comprising mercury cadmium telluride (HgCdTe) can be used as LWIR detecting device. HgCdTe or mercury cadmium telluride (also cadmium mercury telluride, MCT, MerCad Telluride, MerCadTel, MerCaT or CMT) is an alloy of cadmium telluride (CdTe) and mercury telluride (HgTe) with a tunable bandgap spanning the shortwave infrared to the very long wave infrared regions. The amount of cadmium (Cd) in the alloy can be chosen so as to tune the optical absorption of the material to the desired infrared wavelength. CdTe is a semiconductor with a bandgap of approximately 1.5 electronvolts (eV) at room temperature. HgTe is a semimetal, which means that its bandgap energy is zero. Mixing these two substances allows one to obtain any bandgap between 0 and 1.5 eV. Such a device is known, for example, from U.S. Pat. No. 5,828,068 A.

Irradiating the Substrate of i) with Infrared Light

According to step iii) of the inventive method the substrate of i) is irradiated with infrared light at least over the whole wavelength range of 8 to 14 µm.

The irradiation of the substrate of i) is performed with an infrared light emitting source that provides infrared light at least in the whole wavelength range of 8 to 14 µm. According to one embodiment the infrared light emitting source provides infrared light only in the wavelength range of 8 to 14 µm. According to another embodiment the infrared light emitting source provides infrared light in the whole wavelength range of 8 to 14 µm and additionally in a wavelength range below and/or above said wavelength range. In addition to the infrared light the infrared light emitting source may emit other wavelengths outside the infrared, for example in the visible light spectrum.

Infrared light emitting sources that emit infrared light at least over the whole wavelength range of 8 to 14 µm are known to the skilled person. The simplest and cheapest infrared light emitting source is the natural sun light. Other infrared light emitting sources that emit infrared light at least over the whole wavelength range of 8 to 14 µm are commercially available for example from Hawkeye Technologies under the trade name IR-1x Series, Axetris under the trade name EMIRS50 or EMIRS200, Helioworks, or Micro-Hybrid (NovaIR) under the trade name JSIR350-4 or JSIR350-4-R or JSIR350-4-CB or JSIR350-2.

The light emitting source may be selected depending on the substrate and the phosphate and/or sulphate salt. For example, if the substrate is a paper and the phosphate and/or sulphate salt is printed on the substrate in form of a 2×2 cm QR code and the infrared light emitting source has a distance to the substrate of 10 cm, the preferred light emitting source is the EMIRS 200 with the reflector type 3 from Axetris.

According to step iii) the substrate of i) is irradiated with infrared light at least over the whole wavelength range of 8 to 14 µm. This is performed by illuminating the substrate of i) directly or indirectly with said infrared light emitting source. Direct illumination means that the infrared light of the infrared light emitting source irradiates the substrate of i) directly without further diversion. Indirect illumination means that the infrared light of the infrared light emitting source irradiates the substrate of i) indirectly by diversion, for example with mirrors or reflectors.

Furthermore, illumination of the substrate of i) can be performed in transmission or reflection mode. Transmission mode means that the infrared light of the infrared light emitting source shines through the substrate of i). In other words the angle between the infrared light emitting source, the substrate of i) and the LWIR detecting device is from >90° to <270°. Reflection mode means that the infrared light of the infrared light emitting source is reflected from the substrate of i). In other words the angle between the infrared light emitting source, the substrate of i) and the LWIR detecting device is from >0° to 90°.

According to a preferred embodiment the illumination of the substrate of i) is performed in reflection mode and the angle between the infrared light emitting source, the substrate of i) and the LWIR detecting device is from 20° to 25°. However, also higher angels are possible, especially if the print is on the surface and not within the substrate.

According to another preferred embodiment the illumination of the substrate of i) is performed in transmission mode and the angle between the infrared light emitting source, the substrate of i) and the LWIR detecting device is from >90° to <270°. However, transmission measurements are only possible if the substrate is transparent for LWIR light, e.g. if the infrared light in the range of 8 to 14 µm can shine through the substrate. This is possible, for example, if the substrate is a polymer based film or a cellulose cased film. However, this obviously depends on the intensity of the irradiating device and the thickness of the substrate.

According to one embodiment of the present invention the irradiated infrared light is focused and/or scattered by at least one focusing/scattering device.

A focusing device in the meaning of the present invention is a device that can bundle the irradiated infrared light and focuses it to a desired point or place on the substrate. Focusing devices for infrared light are known to the skilled person and are commercially available. According to one embodiment of the present invention the irradiated infrared light is only focused by at least one focusing device.

A scattering device in the meaning of the present invention is a device that can spread or diversify the irradiated infrared light and redirect or divert it to the substrate. Scattering devices for infrared light are known to the skilled person and are commercially available. According to one embodiment of the present invention the irradiated infrared light is only scattered by at least one scattering device.

According to another embodiment of the present invention the irradiated infrared light is focused and scattered by at least one focusing device and at least one scattering device. The focusing and scattering function can be combined in one device.

Suitable focusing and scattering devices for infrared light are known to the skilled person and are commercially available.

According to one embodiment of the present invention, the at least one focusing device is a collimator and/or the at least one focusing/scattering device is a lens. According to one embodiment the focusing device is a collimator. A collimator in the meaning of the present invention is a device that narrows the beams of the irradiated infrared light. To narrow can mean either to cause the direction of motion to become more aligned in a specific direction (i.e., make collimated light or parallel rays), or to cause the spatial cross section of the beam to become smaller (beam limiting device). Collimators suitable for infrared light are known to the skilled person and are commercially available, for example, from Hawkeye Technologies, Axetris, Helioworks, or Micro-Hybrid.

Alternatively, the focusing device is a lens. However, also the scattering device can be a lens. A lens according to the present invention is a transmissive optical device that focuses or disperses a light beam by means of refraction. A simple lens consists of a single piece of transparent material, while a compound lens consists of several simple lenses (elements), usually arranged along a common axis. For example, lenses can be made from materials such as glass or plastic or metal, and are, if required, ground and polished or molded to a desired shape. Alternatively lenses can be made from inorganic materials such as ZnSe. Lenses suitable for infrared light are known to the skilled person and are commercially available, for example, from Thermal Expert under the trade name QVGA lens such as "Wide Lens for Q1 (6.8 mm/f/1.3), (http://www.i3-thermalexpert.com/products/t-e-q1-lens) or lenses for uncooled cameras 8-12 microns from OPHIR, (https://www.ophiropt.com/infrared-optics/catalog-infrared-lenses/lenses-for-uncooled-cameras); Long-Wave Infrared (IR) Aspheric Lenses from Edmund Optics, (https://www.edmundoptics.fr/f/mid-wave-and-long-wave-infrared-ir-aspheric-lenses/13931/); Molded IR Aspheric Lenses from Thorlabs Components, (https://www.thorlabs.com/newgrouppage9.cfm?objectgroup_id=4791&pn=390028-F); or lenses from LightPath technologies, (https://lightpath-technologies.dcatalog.com/v/LPTHCORP-1509_2016-Infrared-Catalog_C/%20-%20page=1#page=0

Additionally or alternatively, the at least one focusing and/or focusing/scattering device is located between the infrared light emitting source if present and the substrate.

Detecting the Intensity of Scattered and/or Emitted Electromagnetic Radiation

According to method step iv) the intensity of electromagnetic radiation scattered and/or emitted reflection by the substrate and the amorphous and/or crystalline structure of phosphate and/or sulphate salts due to the irradiation in step iii) is detected with the LWIR detecting device provided in step ii).

When the substrate of i) is irradiated with infrared light at least over the whole wavelength range of 8 to 14 μm, the atoms and molecules of the substrate comprising the amorphous and/or crystalline structure of phosphate and/or sulphate salts on the surface of the substrate or within the substrate are stimulated and, therefore, scatter and/or emit electromagnetic radiation that can be detected with a LWIR detecting device. There are differences in the absorption of the infrared light of amorphous and/or crystalline structures of phosphate and/or sulphate salts and the substrate, especially if the substrate comprises cellulose. These differences can be detected when detecting the intensity of electromagnetic radiation scattered and/or emitted by the substrate and the amorphous and/or crystalline structure of phosphate and/or sulphate. The differences in the absorption occur because the energy (wavelength) and the intensity is determined by the possible vibrational modes in the excited substance, which is dependent on the type of atoms and the atomic arrangements present in the specific substance.

The inventors surprisingly found that by the above method the electromagnetic radiation scattered and/or emitted reflection by the amorphous and/or crystalline structure of phosphate and/or sulphate salts and by the substrate do not interfere, even if the substrate comprises cellulose. Furthermore, the above method can be performed easily, is cheap and the equipment for the detection is light and transportable.

The substrate, such as, for example, papers, sheets, foils, cardboards, polymer films, woven or non-woven polymeric textiles comprising an amorphous and/or crystalline structure of phosphate and/or sulphate salts on the surface of the substrate or within the substrate can be produced such that the amorphous and/or crystalline structure of phosphate and/or sulphate salts is not or only hardly detectably by the human eye. When irradiated with infrared light at least over the whole wavelength range of 8 to 14 μm the atoms and molecules of the substrate comprising the amorphous and/or crystalline structure of phosphate and/or sulphate salts on the surface of the substrate or within the substrate, scatter and/or emit electromagnetic radiation that can be detected with a LWIR detecting device. As already set out above, there are differences in the absorption of the infrared light of amorphous and/or crystalline structures of phosphate and/or sulphate salts and the substrate, especially if the substrate comprises cellulose. These differences can be detected when detecting the intensity of electromagnetic radiation scattered and/or emitted by the substrate and the amorphous and/or crystalline structure of phosphate and/or sulphate. Especially, if the amorphous and/or crystalline structures of phosphate and/or sulphate salts is irradiated with infrared light at least over the whole wavelength range of 8 to 14 μm.

By this method it is possible to provide substrates, for example, papers, sheets, foils, cardboards, polymer films, woven or non-woven polymeric textiles that are printed or coated with amorphous and/or crystalline structure of phosphate and/or sulphate salts on the surface of the substrate or within the substrate. Preferably the substrate comprises cellulose and/or is printed or coated with an amorphous and/or crystalline structure of phosphate and/or sulphate salts on the surface of the substrate, preferably with calcium phosphate and/or calcium sulphate. The print or coating may be in the form of a pattern on the surface of the substrate and is not or only hardly detectable by the human eye. In a preferred embodiment the substrate is a paper, a sheet or a cardboard and comprises cellulose and optionally calcium carbonate. The print or coating on the substrate is in form of a pattern and preferably comprises calcium phosphate and/or calcium sulphate. The pattern is hardly or not detectable by the human eye. The substrate of step i) is irradiated with infrared light at least over the whole wavelength range of 8 to 14 μm and the intensity of electromagnetic radiation scattered and/or emitted reflection by the substrate and the amorphous and/or crystalline structure of phosphate and/or sulphate salts is detected with the LWIR detecting device. The inventors surprisingly found that by such a method the electromagnetic radiation scattered and/or emitted or reflected by the substrate and the amorphous and/or crystalline structure of phosphate and/or sulphate salts do not interfere. Therefore, it is possible to print a pattern on the surface of the substrate, for example the paper, sheet or cardboard that is not detectable by human eyes but by the LWIR detecting device. By such a method safety codes or hidden patterns can be provided that are only detectable by the method according to the present invention and not by human eyes. Furthermore, such safety codes or hidden patterns can be detected very easily by the inventive method without destroying or damaging the substrate and the print or coating. Furthermore, the inventors surprisingly found that by the above method the electromagnetic radiation scattered and/or emitted or reflected by the amorphous and/or crystalline structure of phosphate and/or sulphate salts and by the substrate do not interfere, especially if the substrate comprises cellulose. Furthermore, the above method can be performed easily and is cheap. Since the equipment for the detection is light and transportable such safety codes or hidden patterns can be detected nearly everywhere. For example, such a safety code or hidden patter can be printed on an ID card or door key card. If the ID card or door key card is pushed into an ID card reader or door lock it can be detected very easy by the inventive method.

ADDITIONAL EMBODIMENTS

According to one embodiment of the present invention, the scattered and/or emitted electromagnetic radiation in step iv) is collected and optionally focused by at least one collecting device. A collecting device in the meaning of the present invention is a device that is suitable for collecting and optionally focusing electromagnetic radiation. Such collecting devices are known to the skilled person and commercially available.

According to one embodiment of the present invention the at least one collecting device is an objective and preferably a lens and/or the at least one collecting device is located between the substrate and the LWIR detecting device.

In the meaning of the present invention an objective is an optical element that gathers electromagnetic radiation scattered and/or emitted or reflected from the substrate and focuses the electromagnetic radiation. Objectives can be a single lens or mirror, or combinations of several optical elements. According to a preferred embodiment the objective is a lens, for example a QVGA lens such as "Wide Lens for Q1 (6.8 mm/f/1.3), commercially available from Thermal Expert (http://www.i3-thermalexpert.com/products/t-e-q1-lens); or lenses for uncooled cameras 8-12 microns from OPHIR, (https://www.ophiropt.com/infrared-optics/catalog-infrared-lenses/lenses-for-uncooled-cameras); Long-Wave Infrared (IR) Aspheric Lenses from Edmund Optics, (https://www.edmundoptics.fr/f/mid-wave-and-long-wave-infrared-ir-aspheric-lenses/13931/); Molded IR Aspheric Lenses from Thorlabs Components, (https://www.thorlabs.com/newgrouppage9.cfm?objectgroup_id=4791&pn=390028-F); or lenses from LightPath technologies, (https://lightpath-technologies.dcatalog.com/v/LPTHCORP-1509_2016-Infrared-Catalog_C/%20-%20page=1#page=0).

Additionally, or alternatively, the at least one collecting device is located between the substrate and the LWIR detecting device.

According to another embodiment of the present invention the scattered and/or emitted electromagnetic radiation is filtered in step iv) by at least one filtering device. A filtering device in the meaning of the present invention is a device that selectively transmits electromagnetic radiation. In other words, depending on the filter some wavelengths of the electromagnetic radiation are blocked and do not transfer through the filter. Filtering devices for electromagnetic radiation are known to the skilled person and are commercially available.

According to one embodiment of the present invention the at least one filtering device is an optical filter, preferably a bandpass filter or a combination of a long pass and short pass filter or a tunable filter.

A bandpass filter in the meaning of the present invention is a device that passes electromagnetic radiation within a certain range and rejects electromagnetic radiation outside that range. Preferably the bandpass filter passes the electromagnetic radiation in the range of 8.8 to 9.3 µm or 10.0 to 10.6 µm or 11.3 to 11.8. Alternatively, two or more bandpass filters can be present, for example one filter that passes the electromagnetic radiation in the range of 8.8 to 9.3 µm and one bandpass filter that passes the electromagnetic radiation in the range of 10.0 to 10.6 µm. Bandpass filters are known to the skilled person, for example from CN 202230219U and from CN 103713347 and are commercially available, for example Infrared (IR) Bandpass Filters from Edmund Optics, (https://www.edmundoptics.fr/f/infrared-ir-bandpass-filters/14290); IR Bandpass Filters: 1.75-9.50 µm Central Wavelength from Thorlabs, (https://www.thorlabs.com/newgrouppage9.cfm?objectgroup_id=5871); Mid Infrared Filters: 1.5-20 µm from Electro Optical Components, (http://www.eoc-inc.com/infrared_filters.htm); IR Filters from IRIDIAN Spectral Technologies (https://www.iridian.ca/specialty-filters/ir-filters/); or Bandpass filters from Spectrogon (https://www.spectrogon.com/product-services/optical-filters/spectrogon-ab/).

According to another embodiment of the present invention the filter is a combination of a long pass and short pass filter, for example a long pass filter of 8 µm and a short pass filter of 8.8 µm or a combination of a long pass filter of 10.3 µm and a short pass filter of 10.8 µm. A long pass filter in the meaning of the present invention is a filter that attenuates shorter wavelengths and transmits (passes) longer wavelengths. A short pass filter in the meaning of the present invention is a filter that attenuates longer wavelengths and transmits (passes) shorter wavelengths. Suitable short and long pass filters are known to the skilled person and are commercially available, for example from Edmund Optics, (https://www.edmundoptics.fr/f/infrared-ir-bandpass-filters/14290); Thorlabs, (https://www.thorlabs.com/newgrouppage9.cfm?objectgroup_id=5871); Electro Optical Componentes, (http://www.eoc-inc.com/infrared_filters.htm); Iridian, (https://www.iridian.ca/specialty-filters/ir-filters/); or Spectrogen, (https://www.spectrogon.com/product-services/optical-filters/spectrogon-ab/).

A tunable filter in the meaning of the present invention is a filter that can be adjusted. Preferably the tunable filter is a tunable MEMS Fabry-Perot filter. Additionally or alternatively, the tunable filter can be tuned such that it passes wavelengths in the range of 8 to 14 µm. Preferably the tunable filter has a spectral resolution of 100 nm and below. With such a filter one can make a scan over the whole spectral range with a spectral resolution being as good as the narrowest pass the filter allows for. This means one could obtain for example a spectral image where each pixel would have a full spectrum in the range 8-14 µm. Such images afterwards can be compared to reference spectra with software and the minerals could be read out. Such tunable filters are known to the skilled person and are commercially available, for example from providers mentioned earlier in the description.

Additionally or alternatively the at least one filtering device is located between the substrate and the LWIR detecting device and preferably between the objective if present and the LWIR detecting device.

According to another embodiment of the present invention the method comprises a further step of reading out the amount of the detected intensity of electromagnetic radiation in step iv) by a computer device, wherein the computer device preferably is a mobile phone. More precisely a computer device such as a mobile phone or a tablet can be connected with the LWIR detecting device. The connection can be done by wire or wireless, for example by Bluetooth, infrared or Near-field communication (NFC). A computer program or app is needed that can read out and process the data of the LWIR detection device. It is especially preferred that the data are converted in a picture format and especially in a multicolor picture. By such a method, the print or coating for example in the form of a pattern on the surface of the substrate or within the substrate which is not or only hardly visible to the neat eye can be seen on the computer device.

According to the present invention a LWIR detecting device is used for detecting the intensity of electromagnetic radiation scattered and/or emitted reflection by an amorphous and/or crystalline structure of phosphate and/or sulphate salts being coated on the surface of a substrate and/or being present in the substrate.

The inventors surprisingly found that a LWIR detecting device can be used for detecting the electromagnetic radiation scattered and/or emitted reflection by an amorphous and/or crystalline structure of phosphate and/or sulphate salts on the surface of the substrate and/or within the substrate. If a substrate comprising an amorphous and/or crystalline structure of phosphate and/or sulphate salts on the surface of the substrate and/or within the substrate is irradiated with infrared light preferably at least over the whole wavelength range of 8 to 14 μm, electromagnetic radiation is scattered and/or emitted by the substrate and the amorphous and/or crystalline structure of phosphate and/or sulphate salts due to the irradiation. The intensity of the electromagnetic radiation can be detected with a LWIR detecting device.

According to the present invention a substrate being at least partially coated with or comprising within an amorphous and/or crystalline structure of phosphate and/or sulphate salts is used for providing information via electromagnetic radiation scatter and/or emission being detectable by LWIR detecting devices.

The inventors surprisingly found that a substrate comprising an amorphous and/or crystalline structure of phosphate and/or sulphate salts on the surface of the substrate and/or within the substrate can be used for providing information via electromagnetic radiation scatter and/or emission being detectable by LWIR detecting devices. If this substrate is irradiated with infrared light preferably at least over the whole wavelength range of 8 to 14 μm, electromagnetic radiation is scattered and/or emitted by the substrate and the amorphous and/or crystalline structure of phosphate and/or sulphate salts due to the irradiation. The intensity of the electromagnetic radiation can be detected with a LWIR detecting device.

The LWIR detecting device and the substrate are identical to the above described LWIR detecting devices and the substrates. Furthermore the additional embodiments described for the inventive method also relate to the above mentioned use.

The inventors surprisingly found that prints or coating comprising the amorphous and/or crystalline structure of phosphate and/or sulphate salts on said substrate can be easily detected without destroying or damaging the substrate and the print or coating. Furthermore, the inventors surprisingly found that the electromagnetic radiation scattered and/or emitted or reflected by the amorphous and/or crystalline structure of phosphate and/or sulphate salts and by the substrate do not interfere if the scattered and/or emitted electromagnetic radiation is detected with the LWIR detecting device, especially if the substrate comprises cellulose.

According to the present invention a LWIR imaging system for detecting an amorphous and/or crystalline structure of phosphate and/or sulphate salts on the surface of a substrate or within a substrate is provided, the system comprising a) an infrared light emitting source that emits in the whole range of 8 to 14 μm and b) a LWIR detecting device.

The LWIR detecting device, the substrate and the infrared light emitting sources are identical to the above described LWIR detecting devices, substrate and infrared light emitting sources.

The inventors surprisingly found that with the LWIR imaging system an amorphous and/or crystalline structure of phosphate and/or sulphate salts on the surface of a substrate and/or within a substrate can be detected. Such detection can be done easily without destroying or damaging the substrate and the print or coating. Since the electromagnetic radiation scattered and/or emitted or reflected by the amorphous and/or crystalline structure of phosphate and/or sulphate salts and by the substrate do not interfere if the scattered and/or emitted electromagnetic radiation is detected with the LWIR detecting device, the print or pattern on the surface or in the surface can be clearly detected. This is especially the case if the substrate comprises cellulose.

Furthermore the additional embodiments described for the inventive method also relate to the LWIR imaging system According to one embodiment of the present invention, the LWIR imaging system is located in a housing, and preferably the housing is connectable to a computer device.

Preferred LWIR imaging systems are described in the examples and the figures.

The scope and interest of the present invention will be better understood based on the following figures and examples which are intended to illustrate certain embodiments of the present invention and are non-limitative.

EXAMPLES

Example 1

Example 1 refers to the geometry and the arrangement of the single components in the LWIR imaging system.

Figure 1:
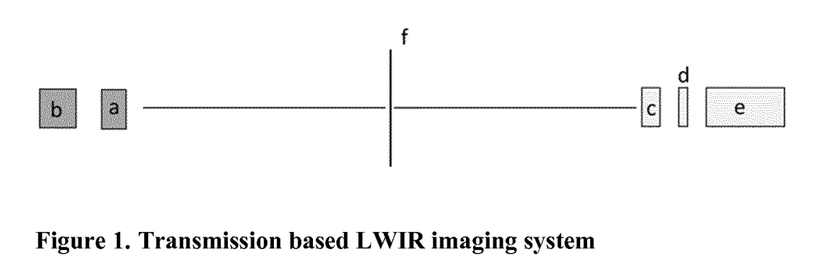
FIG. 1 shows a transmission based LWIR imaging system, as discussed in Example 1.
Figure 2:
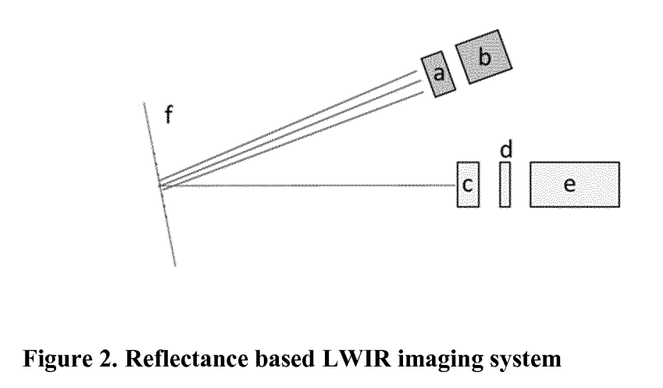
FIG. 2 shows a reflectance based LWIR imaging system, as discussed in Example 1.
Figure 3:
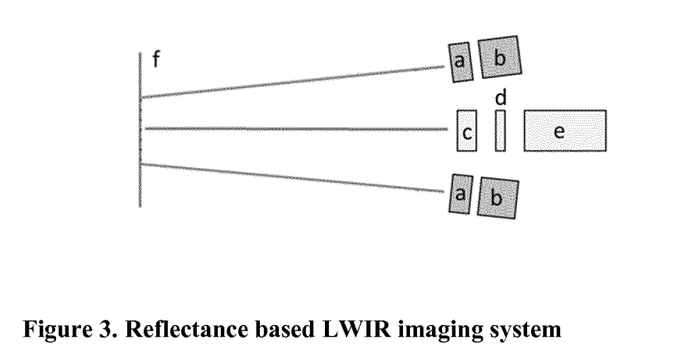
FIG. 3 shows another reflectance based LWIR imaging system, as discussed in Example 1.

FIG. 1 shows the principle for a transmission-based setup and FIGS. 2 and 3 show the principle for a reflectance-based setup. The LWIR imaging system consist of the following parts:
- a: lens and/or collimator
- b: infrared light emitting source or sources
- c: lens
- d: bandpass filter
- e: LWIR detecting device (image sensor)
- f: printed substrate

Example 2

Figure 4:
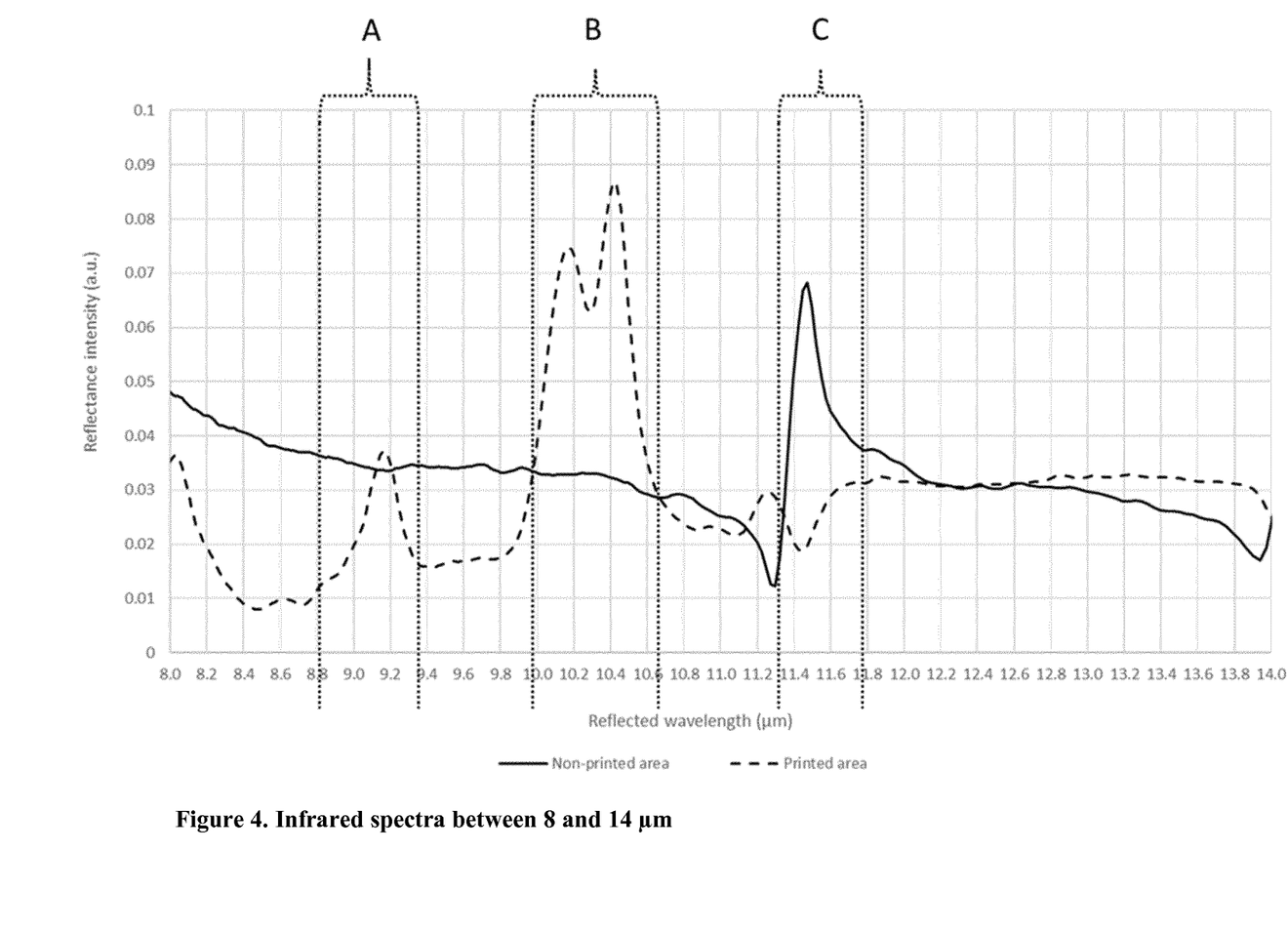
FIG. 4 shows an infrared spectrum between 8 and 14 μm, as discussed in Example 2.

The selection of the filtering device, for example the bandpass filter, depends on the substrate and the amorphous and/or crystalline structure of the phosphate and sulphate salts within the print on the substrate. In FIG. 4 the spectral ranges of an 80 g/m² calcium carbonate containing paper with calcium phosphate containing printed pattern on the surface are shown where the contrast signal to noise ratio is as high as possible. Bandpass filter options to detect the particular calcium phosphate containing pattern could be selected from A, (8.8-9.3 µm), B (10.0-10.6 µm) or C (11.3-11.8 µm).

The spectra in FIG. 4 is measured at 27.9° C. and 49% relative humidity, with an BRUKER VERTEX 70v FTIR Spectrometer having a Liq-N2 cooled MCT detector with MIR sources, with the following specifications and settings:
  6 mm Aperture, Resolution 4 cm, Scans 1024, Signals around 80-350 back ground signal 17, Transmission signal 22,000, reflectivity 2,000.

Example 3

Figure 5:
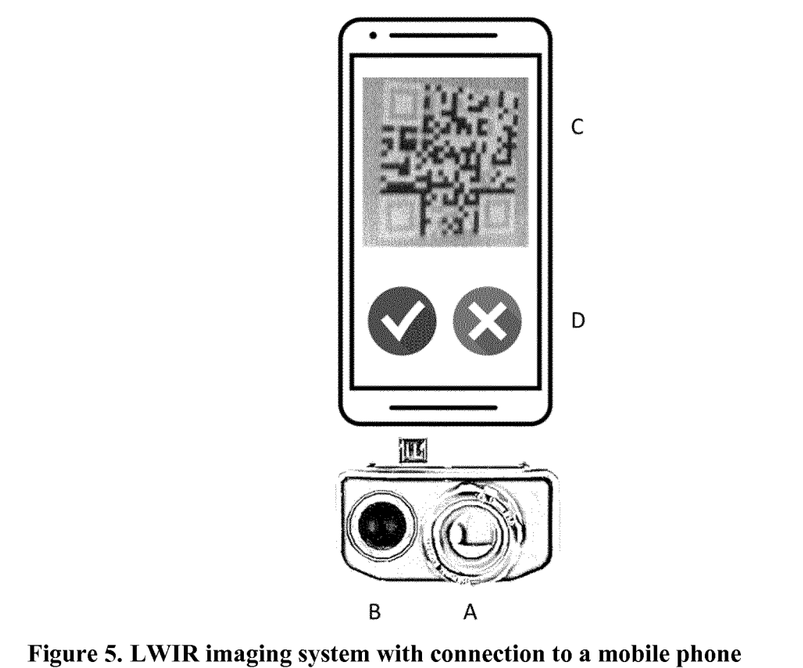
FIG. 5 shows an LWIR imaging system with connection to a mobile phone, as discussed in Example 3.
Figure 6:
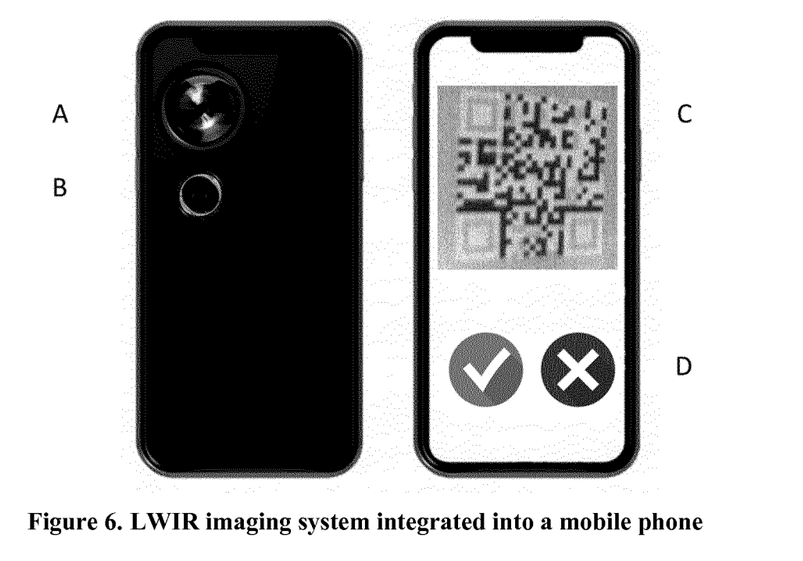
FIG. 6 shows an LWIR imaging system integrated into a mobile phone, as discussed in Example 3.

The LWIR imaging system or parts of the LWIR imaging system can be connected to a computer device, for example, a mobile phone. The LWIR detecting device can be a standalone device with a wireless or physical connection to a computer device such as a mobile phone as shown in FIG. 5 or integrated into a computer device such as a mobile phone as shown in FIG. 6. Abbreviations A, B, C and D have the following meanings:
A: LWIR detecting device (Image sensor)
B: Infrared light emitting source
C: Software for image recognition and pattern decoding
D: Software for verification of authenticity of the code

The invention claimed is:

1. A method for detecting an amorphous and/or crystalline structure of phosphate and/or sulphate salts on the surface of a substrate and/or within a substrate, the method comprising the steps of
  i) choosing a substrate comprising an amorphous and/or crystalline structure of phosphate and/or sulphate salts on the surface of the substrate or within the substrate, where the substrate is chosen so that electromagnetic radiation scattered and/or emitted or reflected by the substrate and by the amorphous and/or crystalline structure of phosphate and/or sulphate salts do not significantly interfere over the wavelength range of 8 to 14 µm,
  ii) providing a LWIR detecting device,
  iii) irradiating the substrate of i) with infrared light at least over the whole wavelength range of 8 to 14 µm, and
  iv) detecting the intensity of electromagnetic radiation scattered and/or emitted reflection by the substrate and the amorphous and/or crystalline structure of phosphate and/or sulphate salts due to the irradiation in step iii) with the LWIR detecting device provided in step ii).

2. The method according to claim 1, wherein the substrate is paper, sheet, foil, cardboard, polymer film, woven polymeric textile, non-woven polymeric textile and/or the substrate comprises cellulose.

3. The method according to claim 1, wherein the phosphate and/or sulphate salts on the surface of the substrate or within the substrate are calcium phosphate and/or calcium sulphate.

4. The method according to claim 1, wherein the substrate is laminated or coated, wherein the laminate or coating layer is at least partially transparent over the whole wavelength range of 8 to 14 µm.

5. The method according to claim 1, wherein the LWIR detecting device is a bolometer or a sensor comprising mercury cadmium telluride.

6. The method according to claim 1, wherein in step iii) the irradiated infrared light is focused and/or scattered by at least one focusing/scattering device.

7. The method according to claim 6, wherein the at least one focusing device is a collimator and/or the at least one focusing/scattering device is a lens and/or the at least one focusing and/or focusing/scattering device is located between the infrared light emitting source if present and the substrate.

8. The method according to claim 1, wherein in step iv) the scattered and/or emitted electromagnetic radiation is collected and optionally focused by at least one collecting device.

9. The method according to claim 8, wherein the at least one collecting device is an objective and/or the at least one collecting device is located between the substrate and the LWIR detecting device.

10. The method according to claim 8, wherein the at least one collecting device is a lens and/or the at least one collecting device is located between the substrate and the LWIR detecting device.

11. The method according to claim 1, wherein in step iv) the scattered and/or emitted electromagnetic radiation is filtered by at least one filtering device.

12. The method according to claim 11, wherein the at least one filtering device is an optical filter, a bandpass filter or a combination of a long pass and short pass filter or a tunable filter, a tunable MEMS Fabry-Perot filter, a bandpass filter in the range of 8.8 to 9.3 µm or 10.0 to 10.6 µm or 11.3 to 11.8 µm or a combination of a long pass filter of 8 µm and a short pass filter of 8.8 µm or a combination of a long pass filter of 10.3 µm and a short pass filter of 10.8 µm, or a tunable filter in the range of 8 to 14 µm and/or the at least one filtering device is located between the substrate and the LWIR detecting device.

13. The method according to claim 11, wherein the at least one filtering device is a bandpass filter in the range of 8.8 to 9.3 µm or 10.0 to 10.6 µm or 11.3 to 11.8 µm or a combination of a long pass filter of 8 µm and a short pass filter of 8.8 µm or a combination of a long pass filter of 10.3 µm and a short pass filter of 10.8 µm, or a tunable filter in the range of 8 to 14 µm.

14. The method according to claim 1, wherein the method comprises a further step of reading out the amount of the detected intensity of electromagnetic radiation in step iv) by a computer device.

15. The method according to claim 1, wherein the substrate is laminated or coated with a polymer layer.

16. The method according to claim 1, wherein the LWIR detecting device is a bolometer.

17. The method according to claim 1, wherein the method comprises a further step of reading out the amount of the detected intensity of electromagnetic radiation in step iv) by a mobile phone.

18. The method according to claim 1, wherein step iii) is
iii) irradiating the substrate of i) with infrared light over the whole wavelength range of 8 to 14 μm.

19. An LWIR detecting device suitable for use for detecting the intensity of electromagnetic radiation scattered and/or emitted reflection by an amorphous and/or crystalline structure of phosphate and/or sulphate salts being coated on the surface of a substrate and/or being present in the substrate, wherein
(a) the LWIR detecting device is located in a housing,
(b) the substrate is paper, sheet, foil, cardboard, polymer film, woven polymeric textile, or non-woven polymeric textile and/or the substrate comprises cellulose, and
(c) the electromagnetic radiation scattered and/or emitted or reflected by the substrate and by the amorphous and/or crystalline structure of phosphate and/or sulphate salts do not significantly interfere over the wavelength range of 8 to 14 μm.

20. The LWIR device according to claim 19, wherein the LWIR device further comprises at least one filtering device and the at least one filtering device is a bandpass filter in the range of 8.8 to 9.3 μm or 10.0 to 10.6 μm or 11.3 to 11.8 μm or a combination of a long pass filter of 8 μm and a short pass filter of 8.8 μm or a combination of a long pass filter of 10.3 μm and a short pass filter of 10.8 μm, or a tunable filter in the range of 8 to 14 μm.

21. An LWIR imaging system for detecting the intensity of electromagnetic radiation scattered and/or emitted reflection by an amorphous and/or crystalline structure of phosphate and/or sulphate salts on the surface of a substrate or within a substrate, the system comprising
a) an infrared light emitting source that emits in the whole range of 8 to 14 μm and
b) a LWIR detecting device,
wherein
(1) the LWIR imaging system is located in a housing,
(2) the substrate is paper, sheet, foil, cardboard, polymer film, woven polymeric textile, or non-woven polymeric textile and/or the substrate comprises cellulose, and
(3) the electromagnetic radiation scattered and/or emitted or reflected by the substrate and by the amorphous and/or crystalline structure of phosphate and/or sulphate salts do not significantly interfere over the wavelength range of 8 to 14 μm.

22. The LWIR imaging system according to claim 21, wherein the LWIR detecting device is a bolometer.

23. The LWIR imaging system according to claim 21, wherein the LWIR imaging system is located in a housing and the housing is connectable to a computer device.

* * * * *